US008837989B2

(12) United States Patent
Yasumoto

(10) Patent No.: US 8,837,989 B2
(45) Date of Patent: Sep. 16, 2014

(54) BELT DRIVING APPARATUS AND IMAGE FORMING APPARATUS

(75) Inventor: Takeshi Yasumoto, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 249 days.

(21) Appl. No.: 13/159,800

(22) Filed: Jun. 14, 2011

(65) Prior Publication Data

US 2011/0318048 A1 Dec. 29, 2011

(30) Foreign Application Priority Data

Jun. 29, 2010 (JP) ................................. 2010-148201

(51) Int. Cl.
*G03G 15/00* (2006.01)
*G03G 15/01* (2006.01)
*B65G 21/20* (2006.01)

(52) U.S. Cl.
USPC ............................ 399/165; 198/840; 399/302

(58) Field of Classification Search
USPC ......... 399/162, 165, 302, 303, 308, 312, 313, 399/329; 198/806, 807, 813, 840
See application file for complete search history.

(56) References Cited

U.S. PATENT DOCUMENTS 5,365,321 A 11/1994 Koshimizu et al.
5,659,851 A 8/1997 Moe et al.
6,053,832 A * 4/2000 Saito ............................. 474/122
6,088,566 A 7/2000 Todome
6,141,522 A 10/2000 Tsuruoka et al.
6,970,674 B2 * 11/2005 Sato et al. ..................... 399/302
7,735,634 B2 * 6/2010 Miyazaki et al. ............. 198/806

(Continued)

FOREIGN PATENT DOCUMENTS

CN 1222690 A 7/1999
DE 3138755 A * 5/1982

(Continued)

OTHER PUBLICATIONS

Communication dated Oct. 19, 2011, forwarding a European Search Report dated Oct. 12, 2011, in European Application No. 11170845.9-1240.

(Continued)

*Primary Examiner* — Robert Beatty
(74) *Attorney, Agent, or Firm* — Fitzpatrick, Cella, Harper & Scinto

(57) ABSTRACT

A belt driving apparatus includes a movable belt member, a stretching member configured to stretch the belt member, and a steering unit configured to stretch the belt member and to be inclined to steer the belt member in a widthwise direction substantially perpendicular to a direction of moving of the belt member. The steering unit includes a rotatable member contacting an inner surface of the belt member and configured to be rotatable with movement of the belt member around a rotational axis of the rotatable member, with the rotational axis extending in the widthwise direction, and non-rotatable members contacting an inner surface of the belt member, provided at each opposite axial end of the rotatable member and configured not to be rotatable with movement of the belt member. In addition, a supporting member supports the rotatable member and the non-rotatable members, and is inclined by frictional force from sliding between the belt member and each of the non-rotatable members, around an axis perpendicular to the rotational axis, and urging members urge the belt member in contact with an outer surface of the non-rotatable members, with each of the urging members disposed against one of the non-rotatable members.

19 Claims, 9 Drawing Sheets

(56) References Cited

U.S. PATENT DOCUMENTS

| | | | | |
|---|---|---|---|---|
| 7,815,042 | B2 | 10/2010 | Oishi | |
| 8,233,823 | B2 * | 7/2012 | Adachi et al. | 399/165 |
| 8,260,182 | B2 * | 9/2012 | Taoka | 399/302 |
| 8,335,461 | B2 * | 12/2012 | Yasumoto | 399/302 |
| 2006/0054467 | A1 | 3/2006 | Oishi | |
| 2009/0016772 | A1 | 1/2009 | Adachi et al. | |
| 2010/0158568 | A1 | 6/2010 | Yasumoto | |

FOREIGN PATENT DOCUMENTS

| | | | | |
|---|---|---|---|---|
| EP | 1635229 | A2 | | 3/2006 |
| EP | 2199869 | A2 | | 6/2010 |
| JP | 10282751 | A | * | 10/1998 |
| JP | 10310212 | A | * | 11/1998 |
| JP | 11-24341 | A | | 1/1999 |
| JP | 11-161055 | A | | 6/1999 |
| JP | 11161055 | A | * | 6/1999 |
| JP | 2001-520611 | A | | 10/2001 |
| JP | 2004226746 | A | * | 8/2004 |
| WO | 97/19009 | | | 5/1997 |

OTHER PUBLICATIONS

Chinese Office Action dated Mar. 24, 2014, in related Chinese Patent Application No. 201110177574.2 (with English translation).

* cited by examiner (a)

(b)

(a)

(b)

(a)

(b)

BELT DRIVING APPARATUS AND IMAGE FORMING APPARATUS

FIELD OF THE INVENTION AND RELATED ART

The present invention relates to a belt driving apparatus for driving a belt member relating to image formation. Specifically, the present invention relates to a belt unit for driving an intermediary transfer belt, a transfer belt, a photosensitive belt, etc., and also relates to an image forming apparatus such as a copying machine, a printer, a printing machine, etc., which includes the belt unit.

In recent years, with speed-up of the image forming apparatus, a constitution in which a plurality of image forming portions are arranged corresponding to a belt member and image forming processes for respective colors are concurrently performed goes mainstream. For example, as a representative belt member in a full-color image forming apparatus of an electrophotographic type, the intermediary transfer belt is used. Onto a belt steering of the intermediary transfer belt, respective color toner images are successively transferred superposedly, and then the color toner images are collectively transferred onto a recording material. This intermediary transfer belt is stretched by stretching rollers, including a driving roller, which are a plurality of stretching member, so that the intermediary transfer belt is rotatable. It has been generally known that such a belt member stretched by the plurality of stretching rollers is accompanied with a problem that the belt member is laterally moved in either one of roller end portions depending on roller outer diameter accuracy or alignment accuracy among the rollers.

This problem is not limited to the intermediary transfer belt but also occurs in the belt driving apparatus for stretching the belt by the plurality of stretching members to drive the belt.

As a countermeasure against this problem, a method in which a steering roller which is a steering member automatically effect belt center alignment by a balance of a frictional force (hereinafter referred to as automatic belt center alignment) has been proposed as a simple and inexpensive method using less number of parts (Japanese Laid-Open Patent Application (Tokuhyo) 2001-520611).

Specifically, this method employs a constitution in which a sliding portion is provided at each of end portions of the steering roller. Further, when the belt member is laterally moved to one end side, a frictional force between the one end-side frictional portion and the belt member is increased. By using a difference between the force generated at one end side and the force generated at the other end side, a swing torque of the steering roller is obtained.

However, the end portion of the belt member contacted to the frictional portion is a free end and therefore the contact belt the belt member end portion and the frictional force is liable to become unstable depending on a shape of the belt member end portion.

When the contact between the belt member end portion and the frictional portion becomes unstable, an amount of the contact between these portions is decreased. As a result, the frictional force generated from the belt per unit width is lowered. Further, when the swing torque necessary to steer the steering roller is intended to be obtained, in order to increase the contact amount, a contact width of the belt member with a sliding portion (frictional portion) is required to be increased. As a result, behavior of the belt member to be conveyed in such that a width of meandering is large and responsiveness during the center alignment is also lowered.

SUMMARY OF THE INVENTION

A principal object of the present invention is to provide a belt driving apparatus capable of improving responsiveness to lateral deviation (movement) of a belt member by enhancing contact stability between a belt member free end and a frictional portion.

According to an aspect of the present invention, there is provided a belt driving apparatus comprising:

a rotatable belt member;

a stretching member for stretching the belt member;

a steering device for stretching and steering the belt member, wherein the steering device includes a rotatable portion which is rotatable with rotation of the belt member, a frictional portion provided at each of longitudinal outsides of the rotatable portion with respect to a widthwise direction and slidable relative to the belt member by being prevented from rotating, supporting means for supporting the rotatable portion and the frictional portion, and a rotation shaft for rotatably supporting the supporting means, and wherein the steering device is capable of moving the belt member in the widthwise direction by rotating the supporting means by a force produced by sliding between the belt member and the frictional portion; and an urging member, provided at each of longitudinal end portion sides of the rotatable portion with respect to the widthwise direction, for urging the belt member against the frictional portion in contact with an outer peripheral surface of the belt member.

These and other objects, features and advantages of the present invention will become more apparent upon a consideration of the following description of the preferred embodiments of the present invention taken in conjunction with the accompanying drawings.

Figure 7:
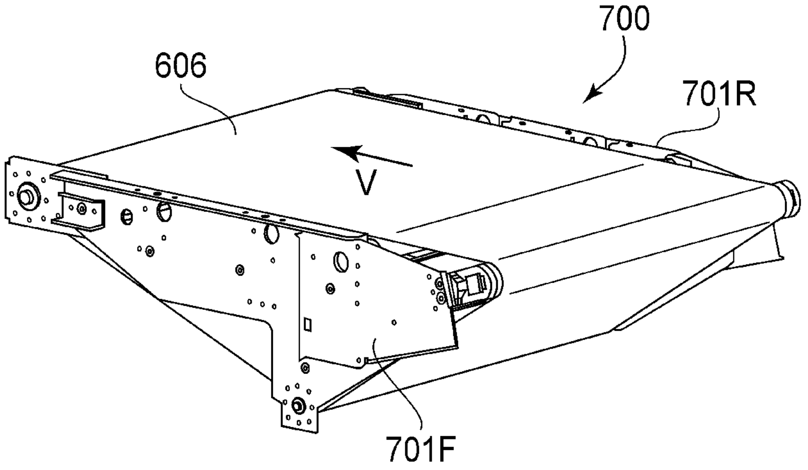
Figure 7:
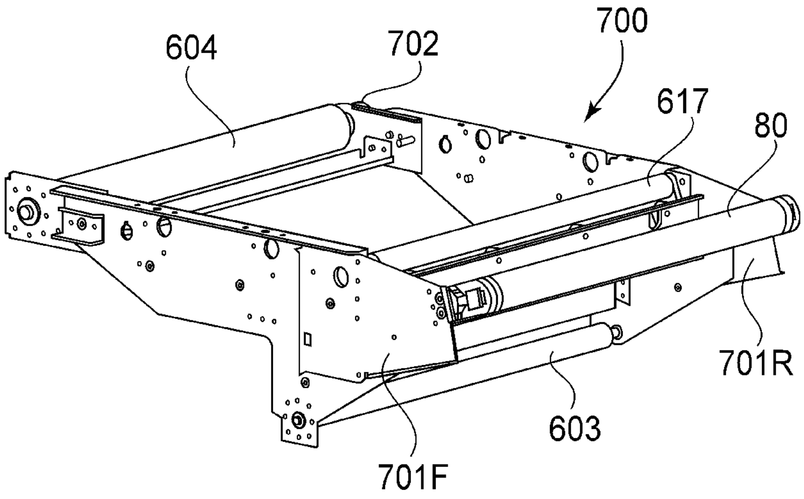

Parts (a) and (b) of FIG. 7 are perspective views for illustrating an intermediary transfer belt unit.

Figure 8:
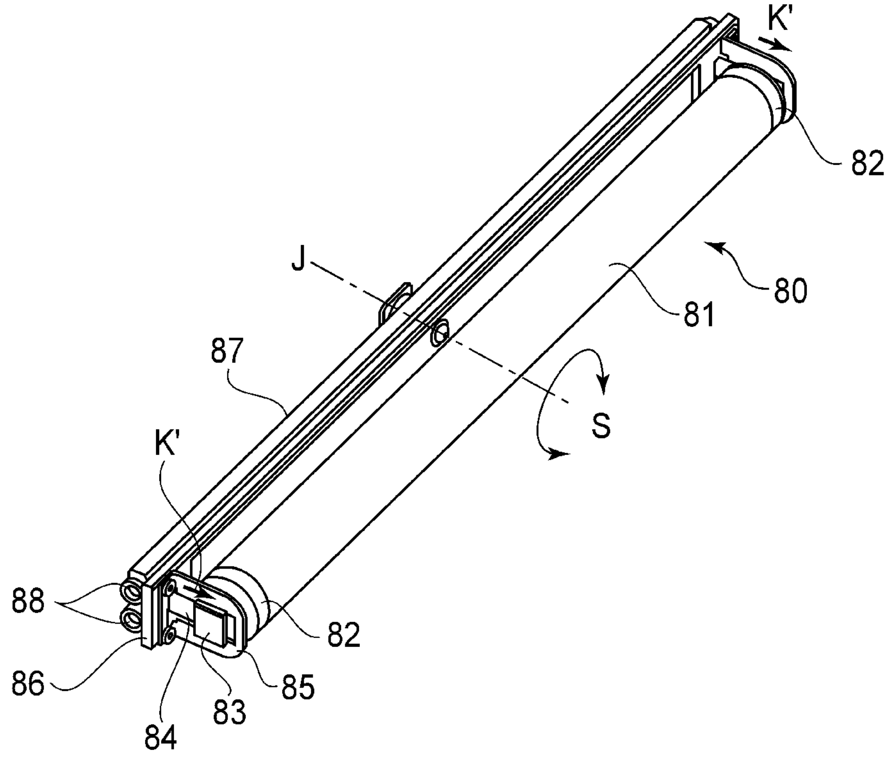
Figure 8:
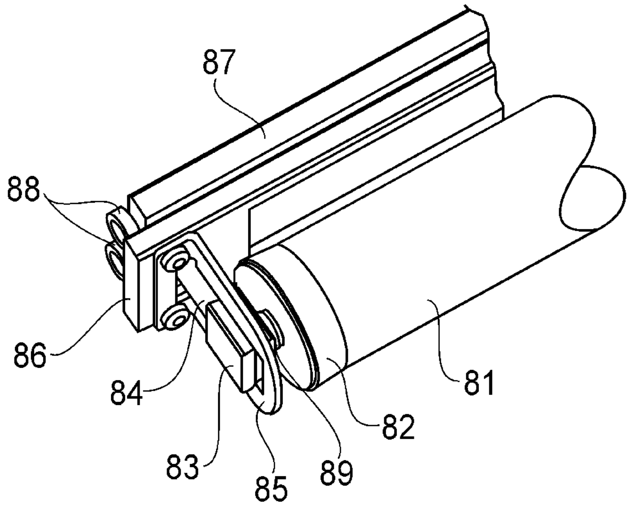

Parts (a) and (b) of FIG. 8 are perspective views for illustrating automatic center alignment.

Figure 9:
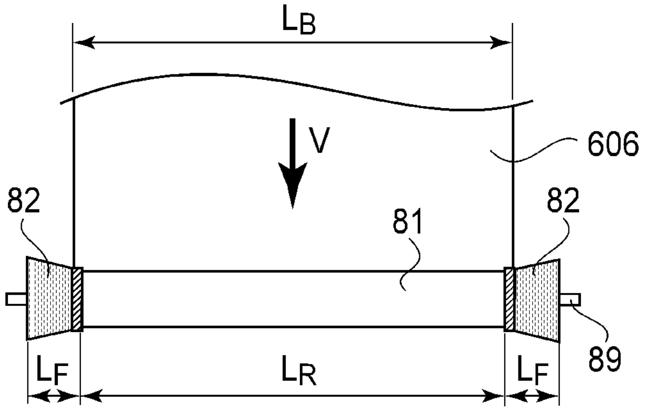
Figure 9:
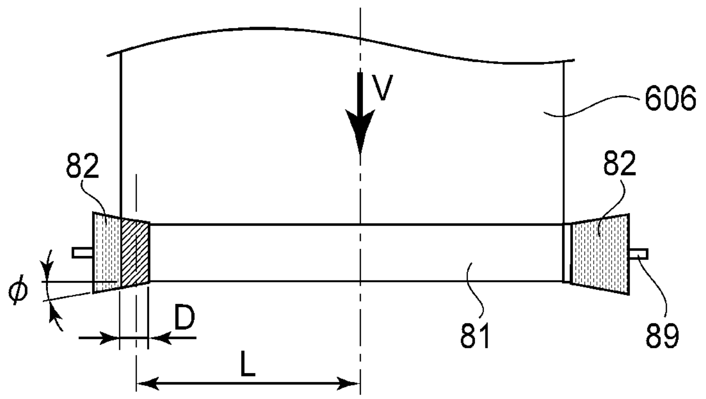

Parts (a) and (b) of FIG. 9 are schematic views for illustrating a contact width of a belt.

Figure 10:
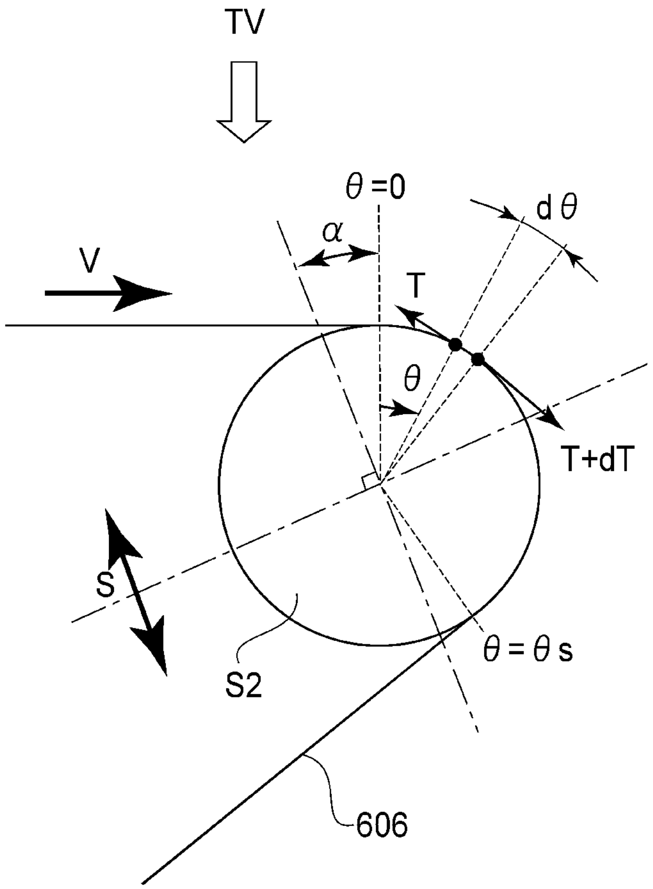

FIG. 10 is a sectional view of an intermediary transfer belt wound about a sliding ring portion.

DESCRIPTION OF THE PREFERRED EMBODIMENTS (Embodiment 1)

<Image Forming Apparatus>

An image forming apparatus in this embodiment of the present invention will be described.

Figure 1:
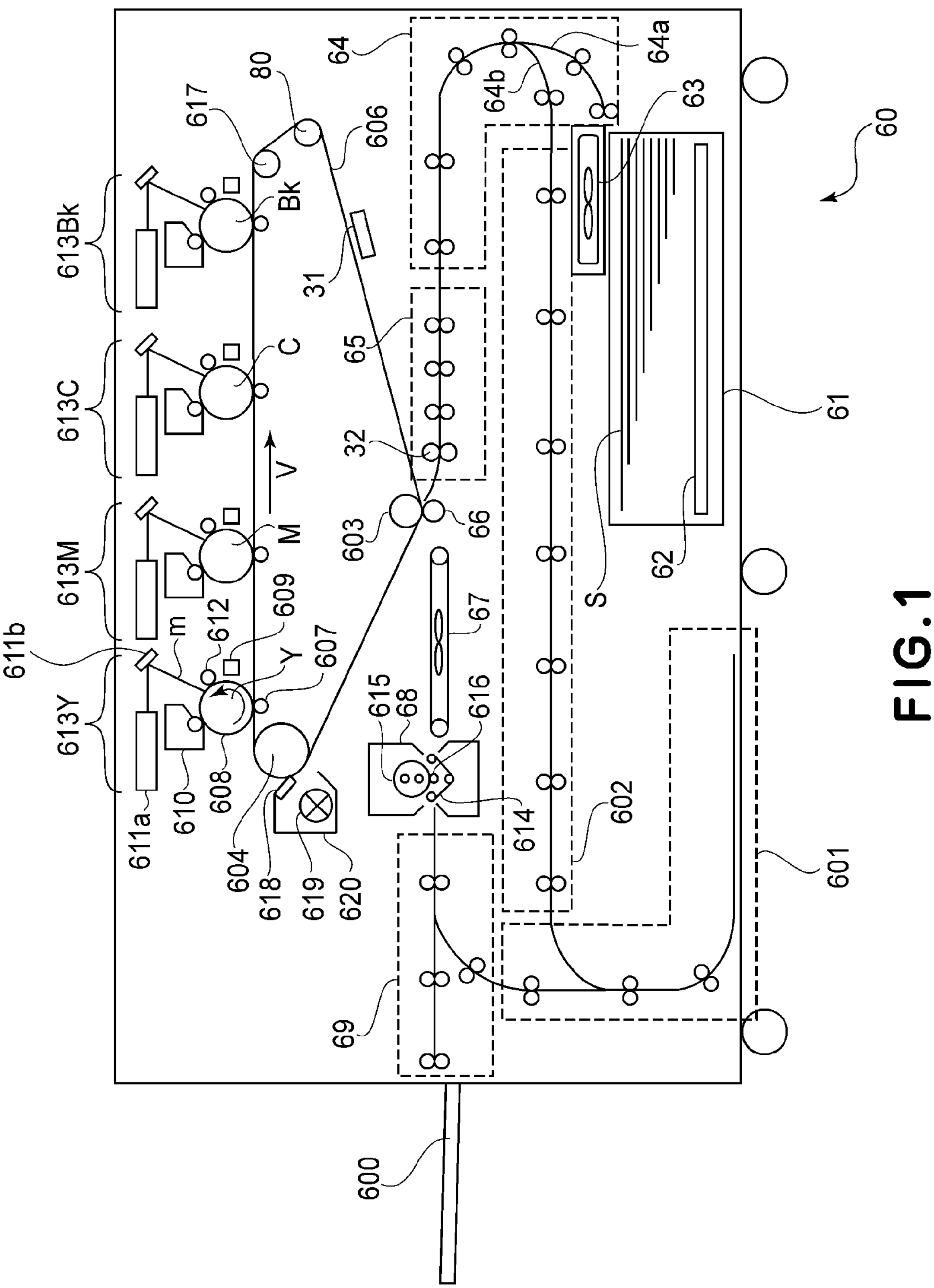
FIG. 1 is a sectional view for illustrating an image forming apparatus of an intermediary transfer type.

First, referring to FIG. 1, an operation of the image forming apparatus will be described. Types of the image forming apparatus may include a plurality of types such as an electrophotographic type, an offset printing type and an ink jet type. The image forming apparatus 60 shown in FIG. 1 is a color image forming apparatus of the electrophotographic type. The image forming apparatus 60 is of a so-called intermediary transfer tandem type in which four image forming portions for four colors are arranged side by side on an intermediary transfer belt. FIG. 1 is a sectional view of the image forming apparatus 60 of this type, which goes mainstream from the viewpoints of excellent compatibility with thick paper and excellent productivity.

<Conveyance Process of Transfer Material>

Sheets of recording material S are stacked on a lift-up device 62 in a recording material accommodating portion 61. The recording material S is fed by sheet feeding device 63 in synchronism with image forming timing. As one of sheet feeding methods, a method using air separation and attraction may be used. In FIG. 1, the method using the air separation and attraction is used. It is also possible to employ other sheet feeding methods. The recording material S fed by the sheet feeding device 63 is passed through a conveying path 64*a* of a conveying unit 64, and then, is conveyed to a registration device 65. After oblique movement correction and timing correction by the registration device 65, the recording material S is sent to a secondary transfer portion. The secondary transfer portion is a transfer nip formed by opposing rollers consisting of an inner secondary transfer roller 603 as a first secondary transfer member and an outer secondary transfer roller 66 as a second secondary transfer member. Then, to the recording material S, predetermined pressure and a predetermined electrostatic load bias are applied, and toner images on an intermediary transfer belt 606 are transferred onto the recording material S.

<Image Formation Process>

An image formation process which is carried out in synchronism with the above-described conveyance process of the recording material S to the secondary transfer portion will be described.

The image forming apparatus 60 in this embodiment includes an image forming portion 613Y which forms an image with yellow (Y) toner, an image forming portion 613M which forms an image with magenta (M) toner, an image forming portion 613C which forms an image with cyan (C) toner, and an image forming portion 613BK which forms an image with black (BK) toner. The image forming portions 613Y, 613M, 613C and 613BK are the same in structure except that they are different in the color of the toner they use. Thus, the image forming process will be described with reference to the image forming portion 613Y as a representative portion.

The image forming portion 613Y, which is a toner image forming means, is constituted by a photosensitive member 608 which is an image bearing member, a charging device 612 for charging the photosensitive member 608, an exposure device 611*a*, a developing device 610, a primary transferring device (member) 607, and a photosensitive member cleaner 609. The steering of the photosensitive member 608 rotating in the direction indicated by an arrow m is uniformly charged by the charging device 612. The photosensitive member 608 is exposed to light by driving the exposure device 611*a*, via a diffraction member 611*b*, on the basis of an inputted signal of image information, so that an electrostatic latent image is formed. Then, the electrostatic latent image formed on the photosensitive member 608 is developed by the developing device 610, so that a toner image is formed on the photosensitive member 608. Then, the yellow toner image is transferred onto the intermediary transfer belt 606, which is a belt member, by applying predetermined pressure and by applying a predetermined electrostatic load bias to the primary transferring member 607. Thereafter, transfer residual toner remaining on the photosensitive member 608 is collected by the photosensitive member cleaner 609, so that the photosensitive member 608 prepares for the next image formation.

As the image forming portion 613, in the case of FIG. 1, four image forming portions for forming yellow (Y), magenta (M), cyan (C), and black (Bk) are present. Therefore, a magenta toner image formed at the image forming portion M is transferred onto the yellow toner image on the intermediary transfer belt 606. The cyan toner image formed at the image forming portion C is transferred onto the transferred magenta toner image on the intermediary transfer belt 606. Further, the black toner image formed at the image forming portion BK is transferred onto the transferred cyan toner image on the intermediary transfer belt 606. Thus, the different color toner images are superposed formed (transferred) on the intermediary transfer belt 606, so that a full-color image is formed on the intermediary transfer belt 606. Incidentally, the number of the colors in this embodiment is four but is not limited to four. Further, the order of the superposed color toner images is also not limited to the above-described order.

Next, the intermediary transfer belt 606 will be described. The intermediary transfer belt 606 is stretched by a driver roller 604 which is a driving member, a steering roller 80 which is a steering member, a stretching roller 617 which is a stretching member, and the inner secondary transfer roller 603 which is an inner secondary transfer (stretching member). The intermediary transfer belt 606 is a belt member which is conveyed and is driven in the direction indicated by an arrow V in the figure.

Further, the steering roller 80 functions also as a tension roller, which provide the intermediary transfer belt 606 with a predetermined tension. The above-described image forming processes successively processed at the image forming portions 613Y, 613M, 613C and 613BK are performed with such timings that the toner image is superposed on the upstream-side color toner image which is primary-transferred onto the intermediary transfer belt 606. Consequently, a full-color toner image finally formed on the intermediary transfer belt 606, and then is conveyed to the secondary transfer portion. Incidentally, the number of the rollers for stretching the intermediary transfer belt 606 is not limited to that in the constitution shown in FIG. 1.

<Secondary Transfer and Subsequent Processes>

As described above, the full-color toner image formed, through the above-described recording material S conveyance process and image forming process, on the intermediary transfer belt 606 is secondary-transferred onto the recording material S at the second transfer portion. Then, the recording material S is conveyed to a fixing device 68 by a front conveying portion 67 for fixing. Although there are various constitutions and types for the fixing device 68, in FIG. 1, the fixing device 68 is of the type in which the toner image is melt-fixed on the recording material S by applying predetermined amounts of pressure and heat thereto in a fixing nip formed between a fixing roller 615 and a pressing belt 614.

Here, the fixing roller 615 is internally provided with a heater as a heat source. The pressing belt 614 is provided with a pressing pad 616 urged by a plurality of stretching rollers and the inner peripheral surface of the belt. The recording material S having passed through the fixing device 68 is, by a branching feeding device 69, subjected to choice of the path as the whether it is discharged onto a sheet discharge tray 600 as it is or is conveyed to a reverse conveying device 601 in the case where both-side image formation is required. In the case where the both-side image formation is required, the recording material S conveyed to the reverse conveying device 601 is changed in direction between its leading end and trailing end by performing a switch back operation to be conveyed into a both-side conveying device 602. Thereafter, the recording material S enters again the sheet conveying path from a refeeding path 64*b* of a conveying unit 64 while being timed to a recording material, for a subsequent job, fed from a sheet feeding device 61, and then is sent to the secondary transfer portion in a similar manner. With respect to the image forming process on the back (second) surface, the process is the same as that in the case of the above-described front (first) surface and will be omitted from description.

Incidentally, the deposited matter such as the toner remaining on the intermediary transfer belt 606 after the secondary transfer is removed from the intermediary transfer belt 606 by a cleaning unit including a cleaning blade 618. Thus, the image forming apparatus 60 prepares for the next image formation. The toner removed from the surface of the intermediary transfer belt 606 is finally collected in an unshown collecting container or the like by a feeding screw 619.

<Steering Structure of Intermediary Transfer Belt>

Parts (a) and (b) of FIG. 7 are perspective views of an intermediary transfer belt unit 700 provided in the image forming apparatus 60, in which (a) shows a state in which the intermediary transfer belt 606 is stretched and (b) shows a state in which the intermediary transfer belt 606 is removed.

With respect to the intermediary transfer belt 606 conveyed in the arrow Z direction by a conveying force of the driving roller 604 into which a driving force is inputted from a driving gear 702, in this embodiment, the steering roller 80 is provided with an automatic belt center alignment mechanism using a balance of the frictional force.

Part (a) of FIG. 8 is a perspective view of the automatic belt center alignment mechanism which is the steering device in the present invention. The steering roller 80 which is a steering member is constituted in the form such that a follower roller portion 81 which is a rotatable portion constituting central portion and a sliding ring portion 82 which is a frictional portion provided at each of longitudinal end side (end portions) with respect to the rotational axis direction of the rotatable portion are co-axially connected. In this embodiment, the follower roller portion 81 has a straight shape. Further, a sliding bearing 83 engaged with a side supporting member 85 at a sliding groove portion (not shown) is slidably urged in a direction indicated by an arrow $P_T$ in the figure. Therefore, the steering roller 80 is also a tension roller for applying tension to the inner peripheral surface of the intermediary transfer belt 606 in an arrow K' direction. Further, the side supporting member 85 constitutes, together with a rotational movement plate 86, a supporting table (supporting means) for supporting the follower roller portion 81 and the sliding ring portion 82 and is rotatably supported, by a steering shaft which is a rotation shaft, in a direction indicated by an arrow S in the figure. Here, a frame stay 87 is a member constituting a casing of the intermediary transfer belt unit 500 and is disposed between a unit front-side plate 701F and a unit rear-side plate 701R. The frame stay 87 is provided with sliding rollers 88 at side surface portions to perform the function of reducing a rotational movement resistance of the rotational movement plate 86.

<Detailed Constitution of Automatic Center Alignment Portion>

A detailed view of the neighborhood of an end portion of the automatic belt center alignment mechanism in the present invention is shown in (b) of FIG. 8. The sliding ring portion 82 in this embodiment has a tapered shape such that a diameter thereof is continuously increased toward the outside of a roller shaft 89 with respect to a longitudinal direction (rotational axis direction). In this embodiment, a taper angle $\phi$ is set at 8 degrees ((b) of FIG. 9). Incidentally, in this embodiment, the tapered shape is used but the sliding ring portion 82 may also have a straight shape.

Relative to the roller shaft 89, the follower roller portion 81 is rotatably supported by bearings or the like incorporated therein, and the sliding ring portion 82 provided at each of the end portions are non-rotatably supported by using parallel pins or the like. Incidentally, in this embodiment, the sliding ring portion 82 has a constitution in which it is fixed so as not to rotate in the rotational direction of the follower roller portion 81, but is not limited thereto. The sliding ring portion 82 may also have a constitution in which it is rotatable. However, in this case, when a constitution in which a torque necessary to rotate the sliding ring portion 82 in the rotational direction of the intermediary transfer belt 606 is larger than that necessary to rotate the follower roller portion 81 in the same direction is employed, the intermediary transfer belt 606 is steerable.

Here, the end portion of the roller shaft 89 has a D-cut shape or the like and thus is non-rotatably supported by the sliding bearing 83. Therefore, when the stretched intermediary transfer belt 606 is conveyed, the follower roller portion 81 of the steering roller 80 does not slide relative to the inner peripheral surface of the belt but the sliding ring portion at each end portion slides relative to the belt. The principle on which the automatic belt center alignment can be effected by such a constitution will be described below in detail.

<Operation Principle of Automatic Center Alignment>

FIG. 10 is a schematic view showing a cross-section of the intermediary transfer belt 606 wound about the sliding ring portion 82. As already described above, the sliding ring portion at each end portion is supported so that it cannot be rotated by the roller shaft 89 and therefore always receives frictional resistance from the inner peripheral surface during the belt conveyance. In FIG. 10, the intermediary transfer belt 606 conveyed and driven in the arrow V direction is wound about the sliding ring portion 82 at a winding angle $\theta_S$. Here, a width (with respect to an axial direction of the steering roller) is considered as a unit width. When a belt length corresponding to a minute winding angle portion d$\theta$ at a certain winding angle $\theta$ is considered, an upstream side is a loosening and thus a tension T acts in a tangential direction, and a downstream side is a stretching side and thus a tension T+dT acts in the tangential direction. Therefore, with respect to the small belt width, a force of the belt exerted on the sliding ring portion 82 in a centripetal direction is approximated as Td$\theta$ and a frictional force dF is, when the sliding ring portion 82 has a friction coefficient $\mu_s$, represented by:

$$dF=\mu_s T d\theta \quad (1).$$

Here, the tension T is dominated by an unshown driving roller and when the driving roller has a friction coefficient $K_r$, the following equation is satisfied.

$$dT=-\mu_r T d\theta \quad (2)., i.e.,$$

$$\frac{dT}{T}=-\mu_r d\theta \quad (2')$$

When the formula (2') is integrated with respect to the above-described winding angle $\theta_s$, the tension T is represented by:

$$T=T_1 e^{-\mu_r\theta} \quad (3)$$

Incidentally, $T_1$ represents a tension at $\theta=0$.

From the formulas (1) and (3), the following equation is satisfied.

$$dF=\mu_s T_1 e^{-\mu_r\theta} d\theta \quad (4)$$

As shown in FIG. 10, in the case where the rotational movement direction of the supporting table with respect to the steering shaft described above is an arrow S direction, a position of winding start ($\theta=0$) provides an argument (angle of deviation) $\alpha$. Therefore, of the force represented by the formula (4), a downward component of the S direction is represented by:

$$dF_s=\mu_s T_1 e^{-\mu_r\theta}\sin(\theta+\alpha)d\theta \quad (5).$$

Further, when the formula (5) is integrated with respect to the winding angle $\theta_S$ described above, a downward force (per unit width), with respect to the arrow S direction, exerted from the intermediary transfer belt 606 on the sliding ring portion 82 during the belt conveyance is obtained as represented by:

$$F_s=\mu_s T_1\int_0^{\theta_s} e^{-\mu_r\theta}\sin(\theta+\alpha)d\theta \quad (6).$$

Parts (a) and (b) of FIG. 9 are schematic views corresponding to top views of the intermediary transfer belt and the steering roller as seen in an arrow TV direction indicated in FIG. 10, in which (a) shows the case where a belt winding position is located at a nominal (center) position in a balanced steady state by the automatic center alignment, and (b) shows the case where lateral belt deviation toward the left side occurs when the belt is conveyed in the arrow V direction.

As shown in (a) of FIG. 9, in this embodiment, a width $L_B$ of the intermediary transfer belt 606 is longer than a length $L_R$ of the follower roller portion 81 and is shorter than a full length $L_R+2L_F$ (the follower roller portion+the sliding ring portions (end portions)) of the steering roller. Further, in the nominal stage, the belt always slides relative to the sliding ring portions with a winding width. That is, in the state in which the steering operation can be normally performed, the belt slides on the sliding ring portion with the winding width. For that reason, in this embodiment, in the case where the belt contacts only one sliding ring portion the state is judge as an abnormal state.

On the other hand, in (b) of FIG. 9 in which the lateral belt deviation occurs, a relationship in winding width between the intermediary transfer belt 606 and the sliding ring portions is assumed such that the belt is in a laterally deviated state with a winding width w only at the left side. That is, the left-side sliding ring portion 82 receives a force $F_S$w in the downward S direction and the right-side sliding ring portion 82 receives a force of 0 (zero) in the downward S direction. Further, it is possible to explain that a difference in frictional force between the end portions is motive power for generating moment $F_S$wL with respect to the steering shaft (with respect to a direction in which the left side which is the laterally deviated side in the assumption of (b) of FIG. 9 is descended. Hereinafter, the moment with respect to the stretch shaft is referred to as steering torque.

The steering roller based on the principle described above is inclined so that the intermediary transfer belt 606 is moved in a direction in which the lateral deviation is eliminated (moved toward the central side), so that the center alignment can be effected. Incidentally, in this embodiment, the sliding ring portion 82 is provided with a taper angle, so that a system which depends on only the friction coefficient &u&$_S$ is created. By setting the friction coefficient $\mu_S$ at a relatively low value, the sliding ring portion 82 is resistant to fluctuation with time during endurance use and it is possible to avoid an abrupt steering operation. Particularly, in the case of the belt member, relating to the image formation, such as the intermediary transfer belt, a change in belt conveyance direction caused by the abrupt steering operation causes color misregistration with respect to a main scan direction and thus the setting of the friction coefficient $\mu_S$ is a very important factor. Specifically, as a material for the sliding ring portion 82 used in this embodiment, a resin material such as POM (polyoxyacetal) is used and the sliding ring portion 82 is set to have approximately $\mu_S=0.3$ and taper angle $\phi=8$ degrees. Further, in consideration of an electrostatic harmful influence due to frictional charging with the intermediary transfer belt 606, the sliding ring portion is also provided with electroconductivity. Further, a dimensional relationship, between the intermediary transfer belt 606 and the sliding ring portions 82 with respect to the widthwise direction, which have already described with reference to (a) of FIG. 9 is also intended to avoid the abrupt steering operation constituting the factor of the color misregistration. This is because the dimensional relationship shown in (a) of FIG. 9 permits a fine center alignment operation since a difference in balance of the frictional force can be always detected.

<Urging Member Constitution>

Figure 2:
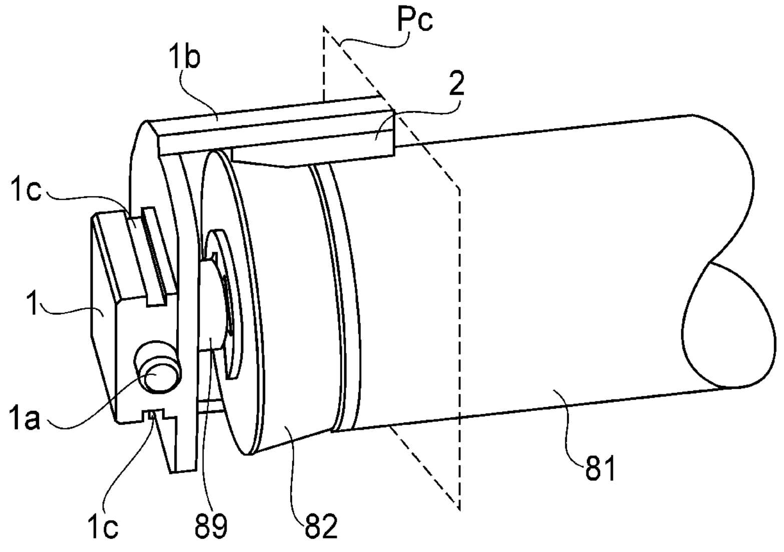
FIG. 2 is a perspective view for illustrating Embodiment 1 of the present invention.

FIG. 2 is an enlarged view of the end portion of the steering roller for the intermediary transfer belt in this embodiment. Specifically, the steering roller has the same constitution as that of the automatic center alignment mechanism described with reference to FIG. 8 and a difference portion is a portion where an urging (pressing) member 2 which is a feature of the present invention is provided.

The steering roller consists of the follower roller portion 81 rotatably shaft-supported by the roller shaft 89 and the sliding ring portions 82 which are provided at longitudinal ends of the follower roller portion 81 (only one end thereof is shown in FIG. 2) and are non-rotatable by the roller shaft 89. In this embodiment, the sliding ring portion 82 has the tapered shape such that the outer diameter is gradually increased toward the outside. The end portion of the roller shaft 89 has a rotation-stopping shape such as the D-cut shape and is supported non-rotatably by the sliding bearing 1. The sliding bearing 1 in this embodiment includes a boss portion 1*a*, a holder portion 1*b* and a slide groove 1*c*. The boss portion 1*a* is engaged with an inner diameter portion of a tension spring 84 and the entire steering roller is urged against the inner peripheral surface of the intermediary transfer belt 606 with predetermined tension. That is, the steering roller also functions as the tension roller. To the holder portion 1*b*, the urging member 2 formed with an elastic member is applied at its inside, and the urging member 2 has a deformation amount which follows the tapered shape of the sliding member 82. The slide groove 1*c* is engaged with the side supporting member 85 shown in FIG. 8 and guides the sliding bearing 1 so that the sliding bearing 1 can move in the urging direction of the tension spring described above.

Figure 3:
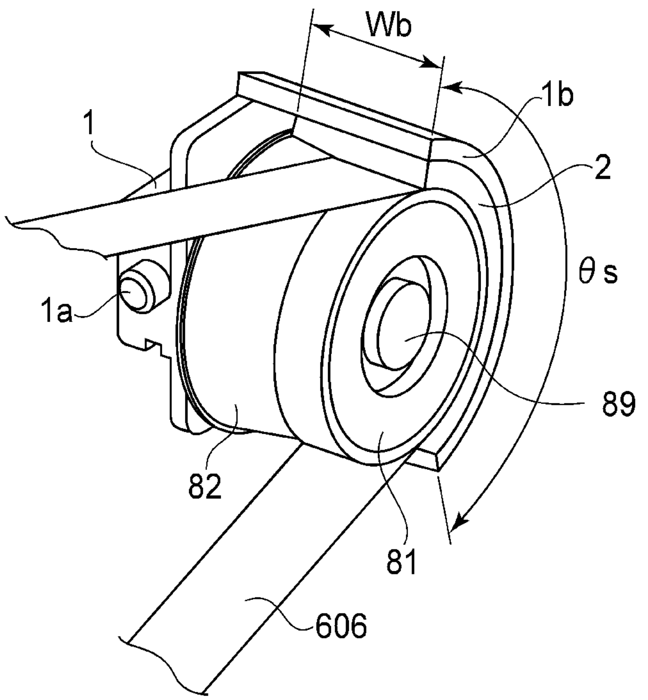
FIG. 3 is a perspective view for illustrating a width of an urging member in the present invention.

The holder portion 1*b* and the urging member 2 will be described more specifically with reference to FIG. 3. FIG. 3 is a sectional view when the steering roller is cut along a plane Pc (including the inside end surface of the urging member 2) shown in FIG. 2 and shows a state in which the intermediary transfer belt 606 is stretched. As is understood from FIG. 3, the urging member 2 contacts the outer surface of the intermediary transfer belt 606 and urges the intermediary transfer belt 606 toward the sliding member 82. The holder portion 1*b* has an arcuate shape so as to cover the belt at the winding angle $\theta_S$, and the urging member 2 at the inner peripheral surface of the holder portion 1*c* has a width Wb including a full width of the sliding ring portion 82 and a width of a part of the follower roller portion 81 and is provided on the basis of a large diameter-side tapered shape portion of the sliding ring portion 82.

Here, the width Wb is set so as to satisfy a relationship, with the respective lengths described with reference to FIG. 10, of: $Wb \geq L_R+2L_F-L_B$. That is, the Wv of the urging member 2 is set at a value which is not less than an amount in which the intermediary transfer belt 6 can physically meander. As a result, it is possible to create a state in which the urging member 2 always treads on the belt end portion, i.e., a state in which the urging member 2 covers the belt end portion. Consequently, there is no possibility that a belt edge is turned up when the belt edge enters the urging member 2, so that the intermediary transfer belt 606 can smoothly move in a thrust direction during the automatic center alignment operation. Further, in this embodiment, a constitution in which the urging member 2 has an elastic layer formed in a uniform thickness of a foamed material or the like is employed, so that the deformation amount is increased with the position of the sliding ring portion 82 toward the large diameter side. As a result, an urging force by the urging member 2 can be increased with an increase in lateral belt deviation amount, so that it becomes possible to generate the frictional force more reliably and efficiently even when waving due to elongation of the belt end portion occurs. That is, the urging force with which the urging member urges an end portion-side area (outside first area) of the sliding ring portion 82 with respect to the widthwise direction of the sliding ring portion 82 is made larger than that with which the urging member urges a follower roller portion 81-side area (inside second area) with respect to the widthwise direction of the sliding ring portion 82. By this constitution, a contact pressure between the belt and the sliding ring portion 82 is increased with the position of the sliding ring portion 82 toward the outside, so that it is possible to reduce beforehand a phenomenon such that the belt end portion is protruded from the sliding ring portion 82 and thus is completely deviated laterally.

Here, the intermediary transfer belt 606 is formed with the resin belt having a base layer of polyimide to have a tensile elastic modulus E of about 18000 N/$cm^2$. Thus, the intermediary transfer belt 606 has such a characteristic that the intermediary transfer belt 606 causes substantially no elongation within a practical range and therefore a factor of a change in circumferential length by the automatic center alignment operation is absorbed by expansion and contraction of the tension spring 84. That is, the axis of the steering roller is changed in its indication with the automatic center alignment. On the other hand, in the constitution in this embodiment, the urging member 2 is integrally held with the sliding bearing 1 described above and therefore, the urging member 2 can follow the inclination change. As a result, even when the automatic center alignment is effected, the deformation amount of the urging member 2 can be kept in a stable state.

Thus, according to this embodiment, when the state of the belt end portion which is the free end is not preferable, i.e., even in the case where the waving or the like occurs, it becomes possible to obtain a desired frictional force between the belt member and the frictional portion. As a result, it is possible to enhance responsiveness to the lateral deviation of the belt member.

Incidentally, in this embodiment, the color image forming apparatus including the intermediary transfer belt is described as an example but another belt driving apparatus and an image forming apparatus including the belt driving apparatus may also be employed. Specifically, a direct transfer belt unit for successively superposing the respective images on the transfer material by attracting the transfer material to a transfer belt as the belt member and an image forming apparatus including the transfer belt unit may also be used. Further, the present invention is also applicable to a photosensitive member belt unit for directly performing processes of charging exposure and developing with respect to a photosensitive member belt as the belt member and then by successively superposing the respective images on the photosensitive member belt and an image forming apparatus including the photosensitive belt unit. Further, the present invention is also effective with respect to a fixing belt of the fixing device.

Incidentally, parameter setting values of the sliding ring portion 82 described in this embodiment are merely an example, so that values of the friction coefficient μ and the taper angle ϕ are not uniquely limited.

(Embodiment 2)

In this embodiment, the same constitutions as those of the intermediary transfer belt unit 700 and the image forming apparatus 60 including the intermediary transfer belt unit 700 are basically employed. Therefore, the constitution of the image forming apparatus 60 and the operation principle will be omitted from the description and a different portion will be principally explained. Further, in the following, the same portions (members) are represented by the same reference numerals or symbols and will be omitted from the description.

<Urging Member Constitution>

Figure 4:
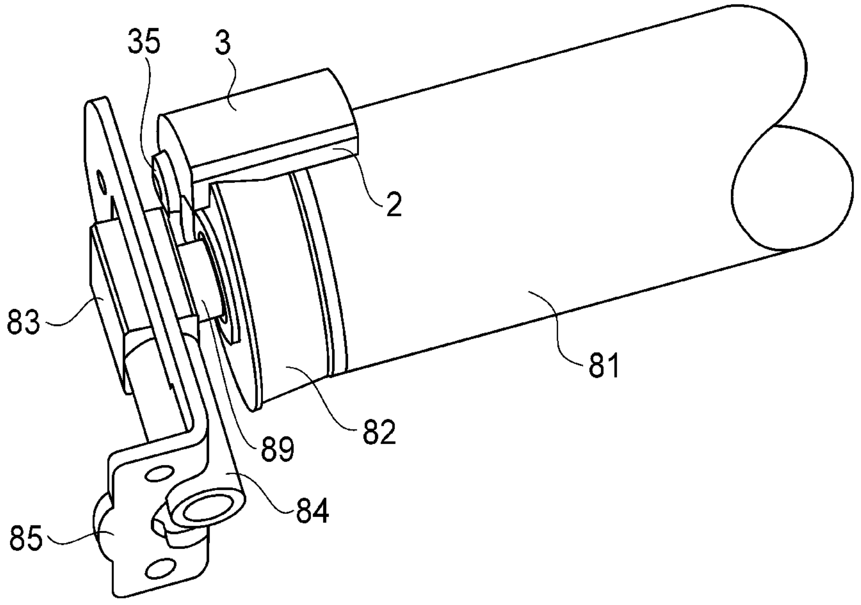
FIG. 4 is a perspective view for illustrating Embodiment 2 of the present invention.

FIG. 4 is an enlarged view of the end portion of the steering roller for the intermediary transfer belt in this embodiment of the present invention. Specifically, the steering roller has the same constitution as that of the automatic center alignment mechanism described with reference to FIG. 8 and a difference portion is a supporting constitution for supporting an urging (pressing) member 2 which is a feature of the present invention is provided.

The steering roller consists of the follower roller portion 81 rotatably shaft-supported by the roller shaft 89 and the sliding ring portions 82 which are provided at longitudinal ends of the follower roller portion 81 (only one end thereof is shown in FIG. 4) and are non-rotatable by the roller shaft 89. The sliding ring portion 82 has the tapered shape such that the outer diameter is gradually increased toward the outside. The end portion of the roller shaft 89 has a rotation-stopping shape such as the D-cut shape and is supported non-rotatably by the sliding bearing 83. The sliding bearing 83 in this embodiment includes a boss portion (not shown) and a slide groove (not shown). The boss portion is engaged with an inner diameter portion of a tension spring 84 and the entire steering roller is urged against the inner peripheral surface of the intermediary transfer belt 606 with predetermined tension. That is, the steering roller also functions as the tension roller. Further, the slide groove is engaged with the side supporting member 85 and guides the supporting member 85 so that the supporting member 85 can move depending on an expansion and construction operation of a tension spring 84.

Here, in this embodiment, from a side surface of the sliding ring portion 82, a holder member 3 is connected by a screw 35. To the holder member 3, the urging member 2 formed with an elastic member is applied at its inside, and the urging member 2 has a deformation amount which follows the tapered shape of the sliding member 82.

The holder member 3 and the urging member 2 basically have the same constitution as the holder portion and the urging member described in Embodiment 1 with reference to FIG. 3 and have an arcuate shape so as to cover the belt at the winding angle $\theta_S$. Further, the urging member 2 at the inner peripheral surface of the holder member 3 has a width Wb including a full width of the sliding ring portion 82 and a width of a part of the follower roller portion 81 and is provided on the basis of a large diameter-side tapered shape portion of the sliding ring portion 82. Also with respect to the width Wb, similarly as in Embodiment 1, the width Wb is set so as to satisfy a relationship, of: $Wb \geq L_R + 2L_F - L_B$, so that the urging member 2 is always in the state in which it treads on the belt end portion. Consequently, there is no possibility that a belt edge is turned up when the belt edge enters the urging member 2, so that the intermediary transfer belt 606 can smoothly move in a thrust direction during the automatic center alignment operation. Further, the urging member 2 is of a foamed material or the like, so that the deformation amount is increased with the position of the sliding ring portion 82 toward the large diameter side. As a result, an urging force by the urging member 2 can be increased with an increase in lateral belt deviation amount, so that it becomes possible to generate the frictional force more reliably and efficiently even when waving due to elongation of the belt end portion occurs.

As described above, in Embodiment 2, the holder member 3 and the urging member 2 are integrally formed with the sliding ring portion 82, so that these members are caused to follow the inclination change of the steering roller by the surface center alignment operation, so that the deformation amount of the urging member 2 can be kept in the stable state.

Thus, according to this embodiment, when the state of the belt end portion which is the free end is not preferable, i.e., even in the case where the waving or the like occurs, it becomes possible to obtain a desired frictional force between the belt member and the frictional portion. As a result, it is possible to enhance responsiveness to the lateral deviation of the belt member.

Incidentally, also in Embodiment 2, similarly as in Embodiment 1, the present invention is applicable to not only the color image forming apparatus including the intermediary transfer belt but also another belt driving apparatus and an image forming apparatus including the belt driving apparatus.

(Embodiment 3)

In Embodiment 3 of the present invention, the image forming apparatus 60 including the intermediary transfer belt unit 700, the arrangement of the steering device is changed from that in Embodiment 1. The arrangement of the driving roller 604 and the steering roller 80 is interchanged. That is, the cleaning blade 618 urges the intermediary transfer belt against the steering roller 80, and the driving roller 604 is disposed between the stretching roller 617 and the inner transfer roller 603. Therefore, the constitution of the image forming apparatus 60 and the operation principle will be omitted from the description and a different portion will be principally explained. Further, in the following, the same portions (members) are represented by the same reference numerals or symbols and will be omitted from the description.

<Urging Member Constitution>

Figure 5:
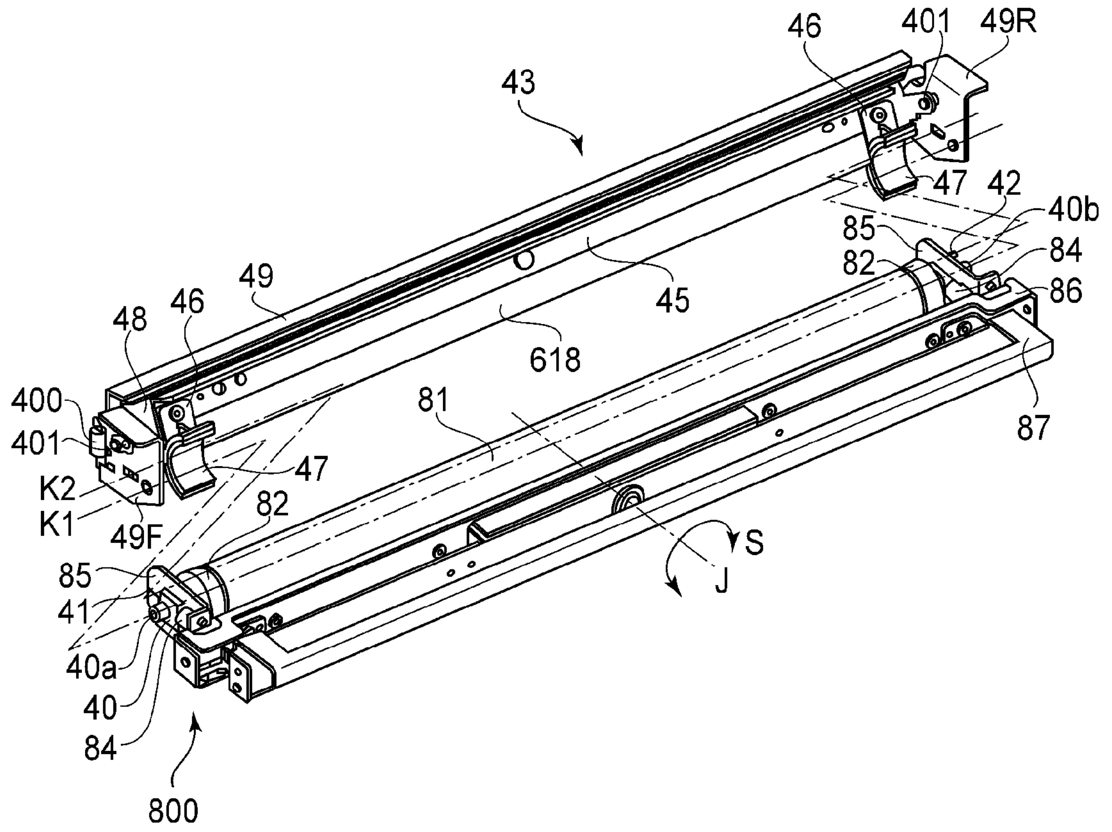
FIG. 5 is a perspective view for illustrating Embodiment 3 of the present invention.

FIG. 5 is a perspective view for illustrating a relationship between a steering device 800 including the steering roller 80 and a cleaning unit 43 to be mounted on the steering device 800. The cleaning unit 43 includes the cleaning blade 618, for removing the transfer residual toner from the intermediary transfer belt 606, provided on the transfer cleaner device 620 described with reference to FIG. 1 and includes a cleaning blade supporting portion for supporting the cleaning blade 618.

The steering roller 80 is provided on a frame stay 87 which is a part of the casing of the intermediary transfer belt unit and a swing operation in an arrow S direction with an axis J as a rotational movement center can be performed. The steering roller 80 is constituted by the follower roller portion 81 and sliding portions at its longitudinal ends, and a roller shaft (not shown) is non-rotatably supported by two sliding bearings 40. Each sliding bearing 40 is engaged with the side supporting member 85 so as to permit the sliding operation and receives the urging force by the tension spring 84. That is, the steering roller 80 also functions as the tension roller for imparting the belt tension. Here, the sliding bearing 40 and the side supporting member 85 include a fixing boss 40*a*, positioning pins 40*b* and 42 and a tap 41 which are used for positioning and fixing the cleaning unit 43.

Figure 6:
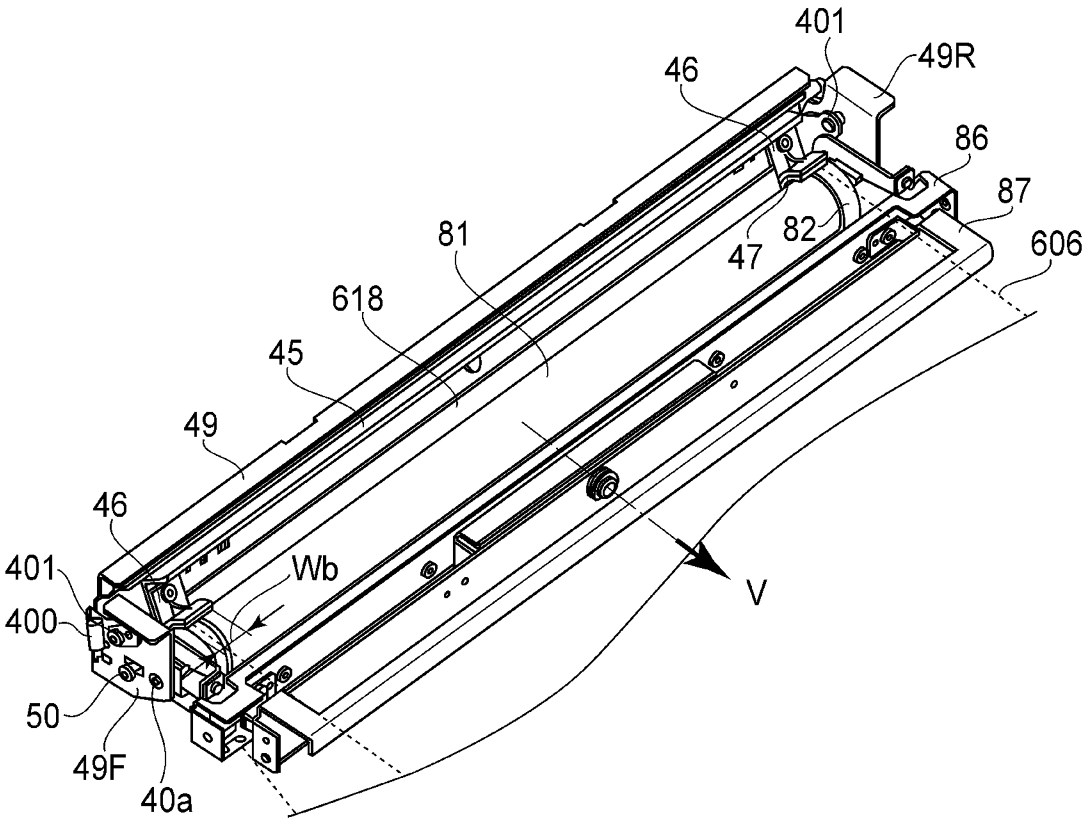
FIG. 6 is a perspective view showing a mounted state of a transfer cleaning device in Embodiment 3 of the present invention.

Next, the constitution of the cleaning unit 43 will be described. A blade supporting plate 45 integrally holds the cleaning blade 618 constituted by an elastic member such as rubber and an end portion seal holder 46 at each of longitudinal ends of the cleaning blade 618. Onto the end portion seal holder 46, an urging member 47 is applied. The blade supporting plate 45 is further attached to a blade pressing plate 48. The blade pressing plate 48 is swingably supported relative to a cleaning unit stay 49 by a swing center shaft 401. At this time, the plate blade pressing plate 48 and the cleaning unit stay 49 are connected to each other with a blade spring 400, so that an end of the cleaning blade 618 contacts the follower roller portion 81 at a predetermined angle and a predetermined pressure. Here, each of a front side plate portion 49F and rear side plate portion 49R of the cleaning unit stay 49 includes a positioning hole and an elongated hole which are used when the cleaning unit stay 49 is mounted on the steering roller 80. Specifically, the positioning pin 40*b* of the sliding bearing 40 is engaged in the positioning hole of the rear side plate portion 49R, and the positioning pin 42 of the side supporting member 85 is engaged in the elongated hole of the rear side plate portion 49R. The fixing boss 40*a* of the sliding bearing 40 corresponds to the positioning hole of the front side plate portion 49F, and the tap 41 of the side supporting member corresponds to the elongated hole of the front side plate portion 49F. However, the fixing boss 40*a* has a stepped end and includes a tap at its end surface and therefore is fixed after the engagement. With respect to the tap 41, a stepped fixing bias 50 (FIG. 6) is used and a shaft diameter of the stepped fixing bias is configured and positioned to be engaged in an elongated circular hole of the front side plate portion 49F. Portions which easily illustrate the above fixing are axes K1 and K2 shown in FIG. 5. Along the respective axes, when the portions of the steering roller 80 and cleaning unit 43 are positioned and connected to each other, a mounted state as shown in FIG. 6 is created. Incidentally, the intermediary transfer belt 606 to be stretched is hypothetically shown in FIG. 6 in an easy-to-understand manner. Incidentally, the cleaning unit 43 constitutes the transfer cleaner device in the form in which the cleaning unit 43 is covered with a cleaner case including a feeding screw.

As is also understood from FIG. 6, a width of the cleaning blade 618 in Embodiment 3 is narrower than that of the follower roller portion 81 and is necessarily contacted to only the follower roller portion 81. Correspondingly, the end portion seal holder 46 and the urging member 47 contacts with a width Wb including a full width of the sliding ring portion 82 and a width of a part of the follower roller portion 81 and is provided on the basis of a large diameter-side end surface of the sliding ring portion 82. Here, with respect to the width Wb, similarly as in Embodiment 1, the width Wb is set so as to satisfy a relationship, of: $Wb \geq L_R+2L_F-L_B$, so that the urging member 47 is always kept in the state in which it treads on the belt end portion. Consequently, there is no possibility that a belt edge is turned up when the belt edge enters the urging member 47, so that the intermediary transfer belt 606 can smoothly move in a thrust direction during the automatic center alignment operation. Further, the end portion seal holder 46 has an arcuate shape which covers the belt at a winding angle $\theta_S$, and at an inner peripheral surface of the belt, the urging member 47 is formed of a foamed material or the like in a uniform thickness, so that the deformation amount is increased with the position of the sliding ring portion 82 toward the large diameter side. As a result, an urging force by the urging member 47 can be increased with an increase in lateral belt deviation amount, so that it becomes possible to generate the frictional force more reliably and efficiently even when waving due to elongation of the belt end portion occurs.

As described above, in Embodiment 3, the cleaning unit 43 is positioned relative to the sliding bearing 40 and therefore the cleaning blade 618 and the end portion seal holder 46 can follow the inclination change of the steering roller in the automatic center alignment operation, so that both the blade contact pressure and the deformation amount of the urging member 47 can be kept in a stable state.

Thus, according to this embodiment, the constitution in which the steering member and the cleaning blade were opposed to each other via the belt member was employed. However, even in such a constitution, when the state of the belt end portion which is the free end is not preferable, i.e., even in the case where the waving or the like occurs, it becomes possible to obtain a desired frictional force between the belt member and the frictional portion. As a result, it is possible to enhance responsiveness to the lateral deviation of the belt member.

Incidentally, in this embodiment, the color image forming apparatus including the intermediary transfer belt and the cleaning blade for cleaning the intermediary transfer belt is described as an example. However, the present invention is also applicable to an apparatus having a constitution in which a cleaning blade for cleaning the belt member; which is not limited to the intermediary transfer belt, and the cleaning blade and the steering member are opposed to each other via the belt member. Specifically, a direct transfer belt unit for successively superposing the respective images on the transfer material by attracting the transfer material to a transfer belt as the belt member and an image forming apparatus including the transfer belt unit may also be used. Further, the present invention is also applicable to a photosensitive member belt unit for directly performing processes of charging, exposure and developing with respect to a photosensitive member belt as the belt member and then by successively superposing the respective images on the photosensitive member belt and an image forming apparatus including the photosensitive member belt unit.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 148201/2010 filed Jun. 29, 2010, which is hereby incorporated by reference.

What is claimed is:

1. A belt driving apparatus comprising:

a movable belt member;

a stretching member configured to stretch said belt member;

a steering unit configured to stretch said belt member and to be inclined to steer said belt member in a widthwise direction substantially perpendicular to a direction of movement of said belt member, said steering unit including:

a rotatable member contacting an inner surface of said belt member and configured to be rotatable with movement of said belt member around a rotational axis of said rotatable member, with the rotational axis extending in the widthwise direction, non-rotatable members contacting an inner surface of said belt member, provided at each opposite axial end of said rotatable member, and configured not to be rotatable with movement of said belt member, wherein when said belt member is moved toward a side in the widthwise direction, a width of the non-rotatable member contacting an inner surface of said belt member is increased in the side and is decreased in the other side so that a first frictional force arising from sliding in the side is larger than a second frictional force arising from sliding in the other side, a supporting member configured to support said rotatable member and said non-rotatable members, wherein said supporting member is inclined, by a difference between the first frictional force and the second frictional force, around an axis perpendicular to the rotational axis, and urging members each provided in said steering unit and configured to urge said belt member against the non-rotatable member in planar contact with a region of said belt member located inside an edge of said belt member with respect to the widthwise direction, each said urging member having a width extending in the widthwise direction.

2. A belt driving apparatus according to claim 1, wherein a width of each of said urging members is greater than that of each of said non-rotatable members.

3. A belt driving apparatus according to claim 1, wherein a width of said belt member is greater than a length of said rotatable portion.

4. A belt driving apparatus according to claim 1, wherein an urging force at which each of said urging members urges said belt member against said non-rotatable members respectively in a first area is greater than an urging force in a second area which is interior to the first area with respect to a widthwise direction of said belt member.

5. A belt driving apparatus according to claim 1, wherein each of said non-rotatable members has a tapered shape such that an outer diameter is increased toward an outside of each of said non-rotatable members respectively.

6. A belt driving apparatus according to claim 1, wherein said urging members are provided on said supporting member.

7. A belt driving apparatus according to claim 1, wherein said belt member is an intermediary transfer belt onto which a toner image is to be transferred.

8. A belt driving apparatus according to claim 1, wherein one of said urging members is provided on each of said non-rotatable members.

9. A belt driving apparatus according to claim 2, wherein a region of each of said urging members partially overlaps a region of said rotatable member with respect to the widthwise direction.

10. A belt driving apparatus according to claim 1, wherein the region of said belt member includes the edge of said belt member.

11. An image forming apparatus comprising:

a movable belt member;

a toner image forming unit configured to form a toner image on said belt member;

a transfer member configured to transfer the toner image from said belt member onto a recording material;

a stretching member configured to stretch said belt member; and a steering unit configured to stretch said belt member and to be inclined to steer said belt member in a widthwise direction substantially perpendicular to a direction of movement of said belt member, said steering unit including:

a rotatable member contacting an inner surface of said belt member and configured to be rotatable with movement of said belt member around a rotational axis of said rotatable member, with the rotational axis extending in the widthwise direction, non-rotatable members contacting an inner surface of said belt member, provided at each opposite axial end of said rotatable member, and configured not to be rotatable with movement of said belt member, wherein when said belt member is moved toward a side in the widthwise direction, a width of the non-rotatable member contacting an inner surface of said belt member is increased in the side and is decreased in the other side so that a first frictional force arising from sliding in the side is larger than a second frictional force arising from sliding in the other side, a supporting member configured to support said rotatable member and said non-rotatable members, wherein said supporting member is inclined by a difference between the first frictional force and the second frictional force, around an axis perpendicular to the rotational axis, and urging members each provided in said steering unit and configured to urge said belt member against the non-rotatable member in planar contact with a region of said belt member located inside an edge of said belt member with respect to the widthwise direction, each said urging member having a width extending in the widthwise direction.

12. An image forming apparatus according to claim 11, wherein a width of each of said urging members is greater than that of said non-rotatable members.

13. An image forming apparatus according to claim 11, wherein a width of said belt member is greater than a length of said rotatable member.

14. An image forming apparatus according to claim 11, wherein an urging force at which each of said urging members urges said belt member against said non-rotatable members respectively in a first area is greater than an urging force in a second area which is interior to the first area with respect to a widthwise direction of said belt member.

15. An image forming apparatus according to claim 11, wherein each of said non-rotatable members has a tapered shape such that an outer diameter is increased toward an outside of each of said non-rotatable members respectively.

16. An image forming apparatus according to claim 11, wherein said urging members are provided on said supporting member.

17. An image forming apparatus according to claim 11, said steering unit further comprising a cleaning unit configured to remove a deposited matter on said belt member, and wherein each of said urging members is provided on said cleaning unit.

18. An image forming apparatus according to claim 11, wherein one of said urging members is provided on each of said non-rotatable members.

19. An image forming apparatus according to claim 11, wherein the region of said belt member includes the edge of said belt member.

* * * * *